United States Patent [19]

Liechti et al.

[11] 4,015,934
[45] Apr. 5, 1977

[54] PROCESS FOR THE DYEING OF SYNTHETIC TEXTILE MATERIAL

[75] Inventors: Hans Wilhelm Liechti, Oberwil; Jurgen Markert, Basel, both of Switzerland

[73] Assignee: Ciba-Geigy Corporation, Ardsley, N.Y.

[22] Filed: Nov. 12, 1973

[21] Appl. No.: 415,282

[30] Foreign Application Priority Data

Nov. 16, 1972 Switzerland ............... 16731/72
Nov. 16, 1972 Switzerland ............... 16730/72

[52] U.S. Cl. .................... 8/41 C; 8/41 R; 8/41 B
[51] Int. Cl.² ............................. D06P 1/18
[58] Field of Search ............ 8/41 R, 41 A–41 D

[56] References Cited

FOREIGN PATENTS OR APPLICATIONS

| | | |
|---|---|---|
| 2,157,229 | 5/1973 | Germany |
| 6,918,341 | 6/1970 | Netherlands |
| 1,297,116 | 11/1922 | United Kingdom |
| 1,360,749 | 7/1974 | United Kingdom |

*Primary Examiner*—Leland A. Sebastian
*Attorney, Agent, or Firm*—Joseph G. Kolodny; Edward McC. Roberts; Prabodh I. Almaula

[57] ABSTRACT

A process for dyeing synthetic textile material in a halogenated hydrocarbons solvent by the exhaust process, comprising the use, for dyeing, of azopyridone dyestuffs of formula I

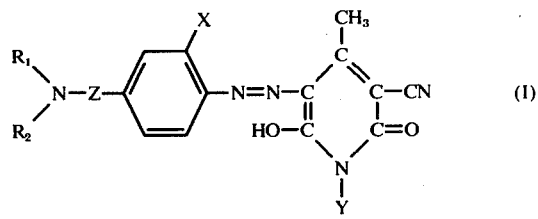

wherein
$R_1$ and $R_2$ each independently represent hydrogen, or an optionally substituted lower alkyl, lower alkenyl, cycloalky or aryl radical, or
$R_1$ and $R_2$ form together with the nitrogen atom binding them, optionally with the inclusion of a further hetero atom, a non-aromatic 5- or 6-membered hetero ring,
X represents halogen, the cyano or nitro group,
Y represents hydrogen, or a lower alkyl group optionally substituted by the hydroxyl or cyano group, and
Z represents —CO— or —SO₂—.

13 Claims, No Drawings

PROCESS FOR THE DYEING OF SYNTHETIC TEXTILE MATERIAL

The present invention relates to an exhaust process for the dyeing of synthetic textile material, particularly fibre material made from linear high-polymeric polyesters, with the use of azopyridone dyestuffs a halogenated hydrocarbon salment, as well as to the material dyed according to the new process.

The French Pat. No. 2,086,255 describes azo dyestuffs containing carbamyl or sulphamyl groups which are suitable for dyeing polyester fibres from a dispersion in organic solvents with the addition of small amounts of water. One of the dyestuffs mentioned is the following:

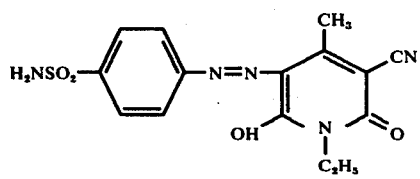

The German Patent (DOS) No. 2,034,264 also describes dyestuffs containing sulphamyl groups and DOS No. 1,952,535 describes dyestuffs containing carbamyl groups for the dyeing of synthetic fibre materials in organic solvents.

The German Pat. (DOS) No. 1,644,122 describes monoazo dyestuffs of the formula

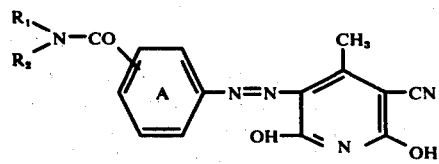

wherein
$R_1$ represents H, alkyl,
$R_2$ represents cycloalkyl, aralkyl, aryl,
A may be substituted by inter alia halogen, CN or $NO_2$.
These dyestuffs are suitable for the dyeing of polyester materials in an aqueous suspension.

Furthermore, the French Pat. Nos. 2,047,269; 2,047,138 and 2,014,146 describe dyestuff preparations which primarily consist of the solution of a dyestuff dissolved in an organic solvent and which are suitable for the preparation of dye baths based on organic solvents. Monoazo dyestuffs having 3-cyano-2,6-dihydroxy-4-methyl-pyridin as coupling component are mentioned.

With the azopyridone dyestuffs of the present invention, level dyeings of good colour strength are obtained by the exhaust process in organic solvents without any addition of water. This process has many technical advantages over the above-mentioned processes using water, e.g. in the manufacture of the necessary dyeing equipment, in the considerable saving of energy and in the avoidance of many problems involved when water is used. Furthermore, the carbamyl or sulphamyl substituted azopyridone dyestuffs according to the present invention having a substituent as defined in ortho-position to the azo bridge are distinguished over the known azopyridone dyestuffs having no substituent in ortho-position to the azo bridge by affording the much sought-after brilliant greenish yellow shades, thus being suitable for combination with blue dyestuffs to obtain green shades from light yellowish green to dark bottle green without having the disadvantage of catalytic fading. By catalytic fading is meant abnormal fading occuring in the use of a dyestuff mixture where the light fastness of one of the dyestuff components is greatly reduced by the presence of the other dyestuff component. Cf. G. S. Egerton and A. G. Morgan, J.S.D.C., 86, 1970, pp. 242–249, especially p. 247 f.; and Charles H. Giles and Robert B. McKay, Textile Research Journal, 1963, No. 7, pp. 528–577, especially p. 547 ff.

The new process comprises the use, for dyeing, of azopyridone dyestuffs which, in any one of the possible tautomeric forms, correspond to the following formula I

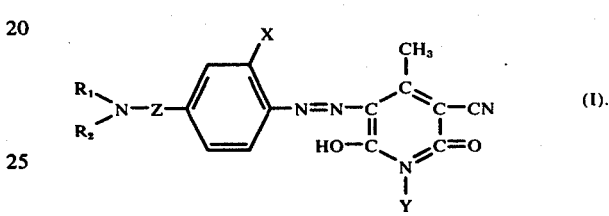

The symbols in this formula have the following meanings:

$R_1$ and $R_2$ each independently represent hydrogen, or an optionally substituted lower alkyl, lower alkenyl, cycloalkyl or aryl radical, or $R_1$ and $R_2$ form together with the nitrogen atom binding them, optionally with the inclusion of a further hetero atom, a non-aromatic 5- or 6-membered hetero ring, X represents halogen such as fluorine, bromine or, in particular, chlorine, the cyano group, or preferably the nitro group, Y represents hydrogen, or a lower alkyl group optionally substituted by the hydroxyl or cyano group, and Z represents —CO— or —$SO_2$—.

If $R_1$ and $R_2$ represent an optionally substituted lower alkyl or alkenyl radical, then these are straight or branched chain alkyl or alkenyl groups (in the latter case, particularly $\Delta_2$-alkenyl groups), which can contain substituents, especially the hydroxyl, cyano or aryl group, such as the phenyl group, or halogen atoms such as chlorine or bromine. In this case, $R_1$ and $R_2$ represent, for example, the methyl, ethyl, iso-propyl, tert.butyl, allyl, β-hydroxyethyl, β- or γ-hydroxypropyl, α-methyl-β-hydroxyethyl, β-cyanoethyl, benzyl, phenethyl, β-chloroethyl or β-bromoethyl groups.

Where $R_1$ and $R_2$ represent a cycloalkyl radical, then suitable groups are, for example, cycloalkyl groups having preferably 5- or 6-membered rings, and particularly the cyclohexyl group.

In the case where $R_1$ and $R_2$ represent an aryl radical, then this belongs preferably to the benzene series; it can contain the usual nonionic ring substituents. Mentioned as such substituents, especially on the phenyl radical, are, for example, halogen such as fluorine, chlorine or bromine, lower alkyl groups such as methyl, or lower alkoxy groups such as methoxy.

If $R_1$ and $R_2$ form together with the nitrogen atom binding them, optionally with inclusion of a further hetero atom, the radical of a nonaromatic 5- or 6-membered hetero ring, then this is, in particular, the pyrrolidino, piperidino or morpholino group.

Where Y represents a lower alkyl group optionally substituted by the hydroxyl or cyano group, then this is, in particular, the methyl, ethyl, $\beta$-hydroxyethyl or $\beta$-cyanoethyl group.

The term "lower" before "alkyl, alkenyl" and "alkoxy" denotes that these groups contain at most 5 carbon atoms.

When Z represents —CO—, one R of $R_1$ and $R_2$ advantageously represents hydrogen or a lower alkyl group, particularly the methyl group, and the other R the phenyl or cyclohexyl group, X denotes the nitro group and Y hydrogen or the $\beta$-hydroxyethyl group, since these dyestuffs have an especially good affinity to polyester material.

Examples of particularly suitable azopyridone dyestuffs wherein Z represents —$SO_2$— are compounds of the following formula II:

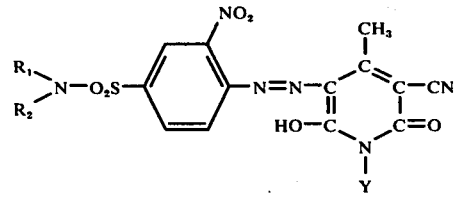
(II)

wherein
$R_1$ represents hydrogen or a lower alkyl group, particularly the methyl group,
$R_2$ represents the phenyl or cyclohexyl group, and
Y represents hydrogen or the $\beta$-hydroxyethyl group, since these dyestuffs have particularly good affinity to polyester material.

The azopyridone dyestuffs of formula I usable according to the invention are known, or may be prepared by known processes.

For example the azopyridone dyestuffs of formula I usable according to the invention wherein Z represents —CO— can be prepared by coupling diazotised amines of formula III

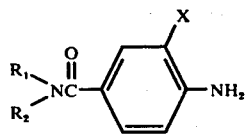
(III)

with coupling components of formula IV

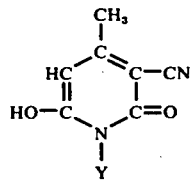
(IV)

whereby in formulae III and IV, the symbols $R_1$, $R_2$, X and Y have the meanings given under formula I.

The following may be mentioned as examples of amines of formula III: 1-amino-2-nitrobenzene-4-carboxylic acidamide, -ethylamide, -$\beta$-hydroxyethylamide, -N,N-dimethylamide, -N-methyl-N-ethylamide, -phenylamide, -N-methyl-N-phenylamide, -cyclohexylamide, -N-methyl-N-cyclohexylamide, 1-amino-2-cyanobenzene-4-carboxylic acid-N-methyl-N-cyclohexylamide or 1-amino-2-chlorobenzene-4-carboxylic acid-$\beta$-hydroxyethylamide.

Coupling components of formula IV are, in particular, 2,6-dihydroxy-3-cyano-4-methyl-pyridine and 1-$\beta$-hydroxyethyl-3-cyano-4-methyl-6-hydroxypyrid-2-one, which can be obtained by cyclisation of esters, amides or nitriles of the corresponding $\beta$-substituted glutaconic acid.

The azopyridine dyestuffs of formula I usable according to the invention wherein Z represents —$SO_2$— can be prepared, e.g., by coupling diazotised amines of formula V

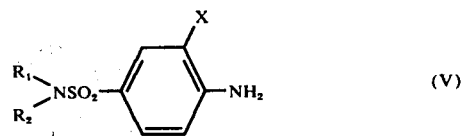
(V)

with coupling components of formula IV

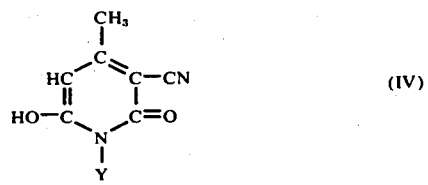
(IV)

whereby in formulae V and IV, the symbols $R_1$, R, X and Y have the meanings given under formula I.

Examples of amines of formula V are: 1-amino-2-nitro- or -2-chlorobenzene-4-sulphonic acid-methylamide, -ethylamide, -$\beta$-hydroxyethylamide, -N,N-dimethylamide, -N,N-diethylamide, -phenylamide, -N-methyl-N-phenylamide, cyclohexylamide or -N-methyl-N-cyclohexylamide.

Coupling components of formula IV are, in particular, 2,6-dihydroxy-3-cyano-4-methylpyridine and 1-ethyl- or 1-$\beta$-hydroxyethyl-3-cyano-4-methyl-6-hydroxypyrid-2-one, which can be obtained by cyclisation of esters, amides or nitriles of the corresponding $\beta$-substituted glutaconic acid.

Halogenated hydrocarbons for the process according to the invention are, in particular, halogenated lower aliphatic hydrocarbons, especially those having a boiling point between 60° and 180° C, e.g. chloroform, carbon tetrachloride, dichloroethane, tetrachloroethane, perchloroethane, 1,1,2-trichloro-2,2,1-trifluoroethane, dibromoethylene, 1- or 2-chloropropane, dichloropropane, trichloropropane, chlorobutane, 1,4-dichlorobutane, 2-chloro-2-methyl-propane or dichlorohexane; also aromatic chlorinated or fluorinated hydrocarbons, such as chlorobenzene, fluorobenzene, chlorotoluene and benzotrifluoride. Especially valuable are chlorinated hydrocarbons boiling between 70 and 130° C, such as trichloroethylene, 1,1,1-trichloroethane and especially tetrachloroethylene ("perchloroethylene"). Mixtures of the mentioned halogenated hydrocarbons can also be used.

The amounts in which the defined azopyridone dyestuffs are used in the dye baths can vary, depending on the desired depth of colour, within wide limits; in general, amounts of 0.001 to 10 per cent by weight of one or more of the mentioned dyestuffs, relative to the material to be dyed, have proved advantageous. It is pointed out that mixtures of the azopyridine dyestuffs to be used according to the invention, with each other or together with other disperse dyestuffs, sometimes result in a better dye yield than the individual dyestuffs.

The azopyridone dyestuffs to be used according to the invention are very difficultly soluble in halogenated hydrocarbons. It is therefore advisable that they be used at least partly in the dispersed state in the organic dye liquor, and with a particle size of below 5 $\mu$, preferably of between 0.1 and 3 $\mu$. The fine dispersion of the dyestuffs can be effected by methods known per se, e.g. by mechanical pulverising of the dyestuffs together with a dispersing agent, and, optionally, relatively small amounts of a halogenated, aliphatic hydrocarbon, particularly perchloroethylene; the particle-size-reducing operation being performed, for example, in a kneading apparatus, preferably however in a grinding mill. Particularly suitable for the purpose as ball mills or sand mills.

The dyestuffs are advantageously used in the form of the usual commercial formulations, containing the finely dispersed dyestuff together and dispersing and wetting agents and optionally other dyeing auxiliaries.

Suitable dispersing agents are commercial anionic, cationic, ampholytic and, in particular, nonionic surface-active agents which are advantageously soluble in the organic dye liquor as defined, but which do not solubilise the dyestuff. Particularly suitable dispersing agents are, for example: oxazolines, cellulose derivatives, higher fatty acids and salts of higher fatty acids, e.g. cobalt stearate or aluminum tripalmitate; high-molecular condensation products of polypropylene with ethylene oxide having molecular weights of 500 to 7000, or polywaxes, e.g. Pluronic P 104 (Wyandotte USA), molecular weight ca. 5500; addition products of alkylene oxides, especially ethylene oxide, with higher fatty acids, fatty acid amides, aliphatic alcohols, mercaptans or amines, with alkylphenols the alkyl radicals of which contain at least 7 carbon atoms; esters of polyalcohols, particularly mono- or diglycerides of fatty acids, e.g. the monoglycerides of lauric, stearic, palmitic or oleic acid, as well as the fatty acid esters of sugar alcohols such as sorbitol, sorbitans and saccharose, for example, sorbitan monolaurate (Span 20), palmitate (Span 40), stearate (Span 60), oleate (Span 80), sesquioleate, trioleate (Span 85), or their oxethylation products; and finally also quaternary ammonium salts such as dodecylammonium acetate, cetylpyridinium acetate, or quaternized alkylammonium polyglycol ethers, such as are described in the Swiss Pat. No. 409,941, Sapamines such as Sapamine CH, KW, MS or OC, polydiene resins, fatty acid amides, or substances which contain the amide groups in ring form, as in the case of the derivatives of polyvinylpyrrolidone, commercially available, e.g. under the name of "Antaron V 216 and V 220", having a molecular weight of ca. 7000 to 9000.

As further additives, the organic dye liquor according to the invention can contain dispersing agents, such as are mentioned above, in amounts of 0.05 to 2 per cent by weight, relative to the weight of the halogenated hydrocarbon, or acids such as formic acid or acetic acid.

The process according to the invention is suitable for the dyeing of synthetic textile material of the most varied kinds, by known methods. Suitable materials are, in particular, fibre materials made from linear, high-polymeric polyesters such as polyethylene glycol terephthalate, polycyclohexane-dimethylene-terephthalate and ethylene glycol, or copolymeric ether ester fibres from p-hydroxybenzoic acid, terephthalic acid and ethylene glycol. Cellulose triacetate, cellulose- 2 ½- acetate, synthetic polyamides such as hexamethylene diamine adipate or poly-ω-caprolactam, and polyurethanes are also suitable. The fibre materials can be in the most diverse stages of processing, e.g. as textured filaments, flock, slubbing, yarn, or as piece-goods such as fabrics or knitted goods, or as ready-made clothing.

In dyeing with the dyestuffs according to the invention, the fact that an addition of water can be completely dispensed with has proved to be particularly advantageous in that, amongst other things, regeneration of the exhausted dye baths is rendered appreciably more easy.

The process according to the invention, which is preferably performed in closed pressure-tight apparatus, e.g. in circulation apparatus, jet machines, winch-dyeing machines, drum dyeing machines, vats, paddle-dyeing machines and cheese dyeing machines, can be carried out, for example, as follows: The material to be dyed is introduced into the halogenated hydrocarbon at room temperature, with a goods to liquor ratio of about 1:3 to 1:40, preferably 1:5 to 1:20; the dyestuff, advantageously finely dispersed, is then added to the liquor, and the dye bath heated to above 100° C, preferably to between 120° and 150° C and maintained at this temperature for about 5 to 120 minutes, advantageously for 15 to 45 minutes. After the desired depth of colour is obtained, or on complete exhaustion of the dye bath, the bath is cooled; the dyed material is removed from the bath and, after rinsing, e.g. by a double treatment with perchloroethylene for 5 minutes at 85° C, optionally dried, advantageously in vacuo with aqeuous saturated steam for about 10 minutes.

By application of the process according to the invention, it is possible to dye synthetic textile material in a simple manner, with high dyestuff yields and excellent fastness properties, from halogenated hydrocarbons to obtain the sought-after brilliant, greenish-yellow shades.

The use of organic dye liquors as the dye bath, instead of the use of water, provides a number of advantages: In the solvent exhaust process, exhaustion of the dye bath occurs more rapidly and with higher yield than in aqueous media, by virtue of which the dyeing times are shorter; and, moreover, the organic dye liquor can be readily recovered, e.g. by passage through an active-charcoal filter, in consequence of which the ever increasing difficulties in the treatment of waste liquors are completely avoided. The cleansed and recovered dye liquors can be re-employed, to an unlimited extent, as organic dye liquors. Furthermore, it is possible, provided that the appropriate equipment is available, to dye with the aid of the process according to the invention synthetic organic material, in excellent dye yield, at the most varied stages of processing, in a protective manner and without the occurrence of contaminated water. By virtue of good bath exhaustion, a reductive afterwashing of the dyed material is in most cases unneccessary. Particularly on polyester brilliant greenish-yellow dyeings are obtained with a high level of fastness to sublimation, good fastness to wet-processing, light and rubbing, and with a good equalisation of material-governed differences in affinity, without impairment of the physical properties of the fibres.

The following examples serve to illustrate the invention. The temperature are expressed in degrees Centigrade.

EXAMPLE 1

10 g of textured polyethylene glycol terephthalate knitted fabric is placed at room temperature into a dye bath situated in a closable dyeing apparatus, with a ratio of goods to liquor of 1:10, the dye bath having been prepared by dispersion of 2 g of a stock dispersion containing 0.1 g of the dyestuff of the formula

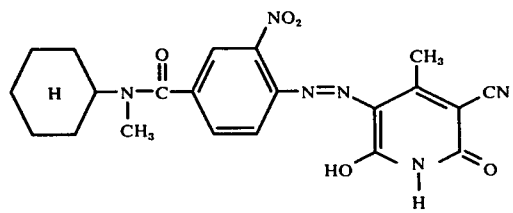

0.04 g of Antaron V 216 (polyvinylpyrrolidone, molecular weight ca. 7000) and 1.86 g of paraffin oil, in 98 ml of tetrachloroethylene. The dyeing apparatus is then closed and the dye bath heated, with continuous movement of the material being dyed, in the course of 10 minutes to 121°, and maintained for 30 minutes at the boiling point of the tetrachloroethylene. After cooling to 80°, the dyed knitted fabric is removed and squeezed out to leave the least possible amount of residual liquor is the material; it is afterwards rinsed for 5 minutes in the above mentioned apparatus by being heated with tetrachloroethylene containing 0.25% of hexamethylphosphoric acid triamide, with a ratio of goods to liquor of 1:8; it is then rinsed again with tetrachloroethylene at 80° for 5 minutes, and subsequently dried. The residual dye liquor is practically colourless.

There is obtained in this manner on textured polyethylene glycol terephthalate knitted fabric a deeply coloured, level, greenish-yellow dyeing having excellent fastness to light and to wet processing.

The azopyridone dyestuff used in the above example had been produced as follows:

13.35 parts of 4-amino-3-nitrobenzoic acid-N-methyl-N-cyclohexylamide are diazotised, and coupled at 5° to 10° with 7.5 parts of 3-cyano-4-methyl-6-hydroxypyridone-2 in an acetic acid solution. Within one hour, the temperature of the coupling mixture is allowed to rise to 20°; the yellow azo dyestuff formed and precipitated is then filtered off, the filter residue washed with water until a neutral reaction is indicated, and dried in vacuo; yield: 18.0 parts.

The stock dispersion employed in the example was prepared as follows:

30 g of the dyestuff of the formula given in Example 1 is ground with 12 g of Antaron V 216 (modified polyvinylpyrrolidone) and 558 g of paraffin oil in a bead-ball mill until the particle size of the dyestuff is below 1 $\mu$. After separation of the grinding agent, a 5% liquid dye preparation is obtained.

If, instead of the dyestuff used in Example 1, the same amount of one of the dyestuffs listed in the following table, column II, is used, the procedure being otherwise as described in the example, then dyeings having similarly good properties and shades as given in column III are obtained on textured polyester material.

TABLE

| I Example No. | II Dyestuff | III Shade on textured polyester |
|---|---|---|
| 2 | ![structure] | greenish-yellow |
| 3 | ![structure] | yellow |
| 4 | ![structure] | greenish-yellow |

TABLE-continued

| I<br>Example<br>No. | II<br>Dyestuff | III<br>Shade on textured polyester |
|---|---|---|
| 5 | [Structure: 4-(N,N-dimethylcarbamoyl)-2-nitrophenylazo coupled to 3-cyano-4-methyl-6-hydroxy-1-(2-hydroxyethyl)-2-pyridone] | greenish-yellow |
| 6 | [Structure: 4-(N-ethylcarbamoyl)-2-nitrophenylazo coupled to 3-cyano-4-methyl-6-hydroxy-1-(2-hydroxyethyl)-2-pyridone] | greenish-yellow |
| 7 | [Structure: 4-carbamoyl-2-nitrophenylazo coupled to 3-cyano-4-methyl-6-hydroxy-1-(2-hydroxyethyl)-2-pyridone] | yellow |
| 8 | [Structure: 4-(N-(2-hydroxyethyl)carbamoyl)-2-chlorophenylazo coupled to 3-cyano-4-methyl-6-hydroxy-2-pyridone] | greenish-yellow |
| 9 | [Structure: 4-carbamoyl-2-nitrophenylazo coupled to 3-cyano-4-methyl-6-hydroxy-2-pyridone] | greenish-yellow |
| 10 | [Structure: 4-(N-ethylcarbamoyl)-2-nitrophenylazo coupled to 3-cyano-4-methyl-6-hydroxy-2-pyridone] | greenish-yellow |
| 11 | [Structure: 4-(N,N-dimethylcarbamoyl)-2-nitrophenylazo coupled to 3-cyano-4-methyl-6-hydroxy-2-pyridone] | greenish-yellow |
| 12 | [Structure: 4-(N-phenylcarbamoyl)-2-nitrophenylazo coupled to 3-cyano-4-methyl-6-hydroxy-2-pyridone] | greenish-yellow |

TABLE-continued

| I Example No. | II Dyestuff | III Shade on textured polyester |
|---|---|---|
| 13 | 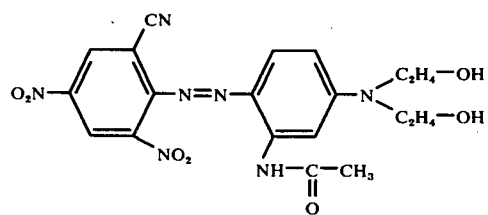 | greenish-yellow |
| 14 | | greenish-yellow |

EXAMPLE 15

10 g of textured polyethylene glycol terephtalate knitted fabric is placed at room temperature into a dye bath situated in a closed dyeing apparatus, with a ratio of goods to liquor of 1:10, the dye bath having been prepared by the dispersion of 0.8 g of the stock dispersion described in Example 1, and 0.5 g of a stock dispersion, containing 0.025 g of the dyestuff of the formula 0.01 g of Antaron V 216 and 0.465 g of paraffin oil, in 98.5 ml of tetrachloroethylene. The dyeing apparatus is then closed, and the dye bath heated, with continuous movement of the material being dyed, in the course of 10 minutes to 121°, and maintained for 60 minutes at the boiling point of the tetrachloroethylene. After cooling to 80°, the material is rinsed and subsequently dried, as described in Example 1.

In this manner there is obtained on textured polyethylene glycol terephthalate knitted fabric a level, deeply coloured green dyeing which has good fastness to wet processing and to rubbing and which, even after 160 hours' exposure to light, displays no catalytic fading.

If, instead of of the stock dispersion according to Example 1 used in Example 15, an equivalent amount of a corresponding 5% stock dispersion obtained with the dyestuff of the formula given in Example 3 is employed, the procedure being otherwise the same as that described in Example 15, then a dyeing having similarly good overall properties is obtained on textured polyester material.

EXAMPLE 16

10 g of textured polyethylene glycol terephthalate yarn is placed at room temperature into a dye bath located in a closable dyeing apparatus, with a ratio of goods to liquor of 1:10, the dye bath having been prepared by dispersion of 0.8 g of the stock dispersion described in Example 1, and 0.266 g of a stock dispersion containing 0.04 g of a dyestuff mixture of the formulae

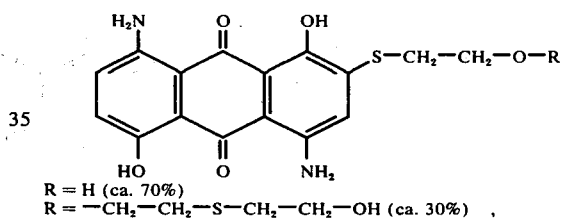

R = H (ca. 70%)
R = —CH$_2$—CH$_2$—S—CH$_2$—CH$_2$—OH (ca. 30%), 0.04 g of Antaron V 216 and 0.186 g of paraffin oil, in 99 ml of tetrachloroethylene. Dyeing, rinsing and drying are performed as described in Example 1.

There is obtained in this manner on polyethylene glycol terephthalate yarn a level, deeply coloured green dyeing which is very well dyed throughout and which exhibits even after 160 hours' exposure to light no signs of catalytic fading.

EXAMPLE 17

If, instead of the knitted fabric made from polyethylene glycol terephthalate described in Example 1, 10 g of a fabric made from cellulose-2 ½-acetate, 10 g of a fabric made from cellulose triacetate or 10 of a polyamide-6.6-tricot is used, the procedure being otherwise as described in Example 1, then there is obtained on the mentioned textile materials a deeply coloured, level, greenish-yellow dyeing which is well dyed throughout and which has good fastness to wet processing and to light.

EXAMPLE 18

10 g of textured polyethylene glycol terephthalate knitted fabric is placed at room temperature into a dye bath situated in a closable dyeing apparatus, with a ratio of goods to liquor of 1:10, the dye bath having been prepared by dispersion of 2 g of a stock dispersion containing 0.1 g of the dyestuff of the formula

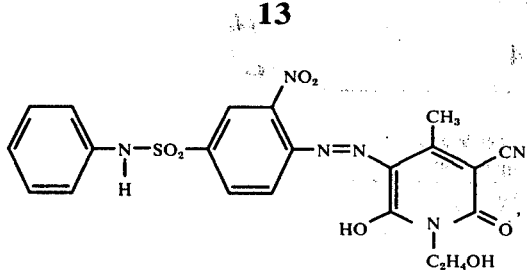

0.04 g of Antaron V 216 (polyvinylpyrrolidone, molecular weight ca. 7000) and 1.86 g of paraffin oil, in 98 ml of tetrachloroethylene. The dyeing apparatus is then closed and the dye bath heated, with continuous movement of the material being dyed, in the course of 10 minutes to 121°, and maintained for 30 minutes at the boiling point of the tetrachloroethylene. After cooling to 80°, the dyed knitted fabric is removed and squeezed out to leave the least possible amount of residual liquor in the material; it is afterwards rinsed for 5 minutes in the above mentioned apparatus by being heated with tetrachloroethylene containing 0.25% of hexamethylphosphoric acid triamide, with a ratio of goods to liquor of 1:8; it is then rinsed again with tetrachloroethylene at 80° for 15 minutes, and subsequently dried. The residual dye liquor is practically colourless.

There is obtained in this manner on textured polyethylene glycol terephthalate knitted fabric a deeply coloured, level, greenish-yellow dyeing having excellent fastness to light and to wet processing.

The dyestuff used in the above example had been prepared as follows: 14.7 parts of 1-amino-2-nitro-4-sulphonic acid anilide are diazotised in 15 ml of 1N hydrochloric acid with 25 ml of 2N sodium nitrite solution at 0° to 5°, and, at the same temperature, coupled with 8.9 parts of N-β-hydroxyethyl-3-cyano-4-methyl-6-hydroxy-pyridone-2 dissolved in 150 ml of 10% acetic acid. In the course of 1 hour, the temperature of the coupling mixture is allowed to rise to 20°; the precipitated yellow azopyridone dyestuff is then filtered off, the filter residue washed with water until neutral, and dried in vacuo; yield 19.5 parts.

The stock dispersion used in the example was obtained as follows:

30 g of the dyestuff of the formula given in Example 1 is ground with 12 g of Antaron V 216 and 558 g of paraffin oil in a bead-ball mill until the particle size of the dyestuff is below 1 μ. After separation of the grinding medium, a 5% liquid dye preparation is obtained.

If, instead of the dyestuff used in Example 18, the same amount of the dyestuffs listed in column II of the following table is employed, the procedure being otherwise as described in the example, then on textured polyester material are obtained equally good dyeings having similarly good overall properties and displaying the shades of colour given in column III.

TABLE

| I Ex. No. | II Dyestuff | III Shade on polyester |
|---|---|---|
| 19 | (structure) | yellow |
| 20 | (structure) | greenish-yellow |
| 21 | (structure) | greenish-yellow |
| 22 | (structure) | yellow |

TABLE-continued
| I<br>Ex.<br>No. | II<br>Dyestuff | III<br>Shade on polyester |
|---|---|---|
| 23 | 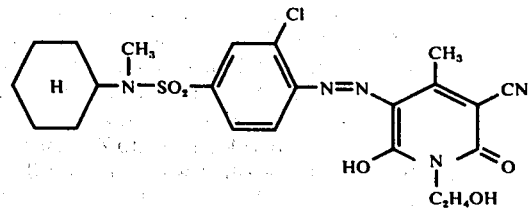 | yellow |
| 24 | 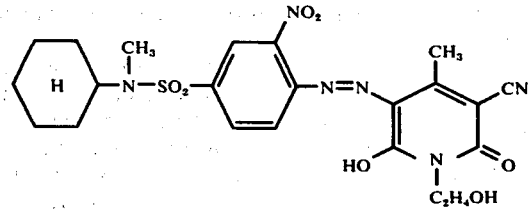 | yellow |
| 25 | 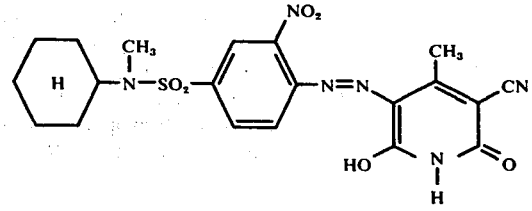 | greenish-yellow |
| 26 | 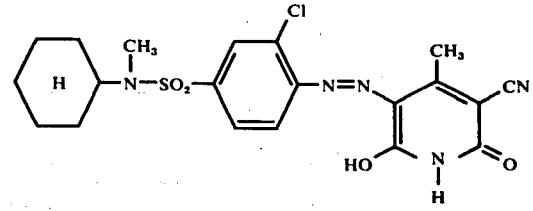 | greenish-yellow |
| 27 | 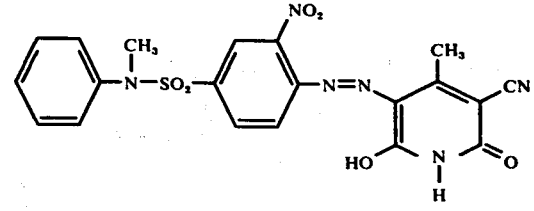 | yellow |
| 28 | 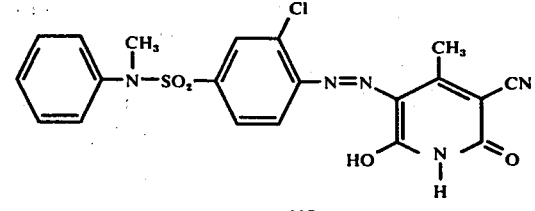 | greenish-yellow |
| 29 | 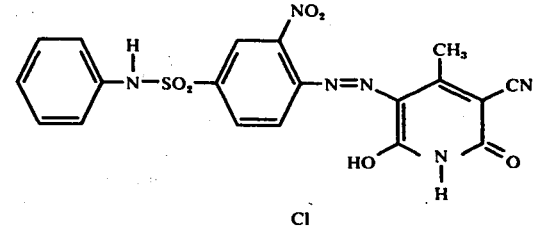 | yellow |
| 30 | 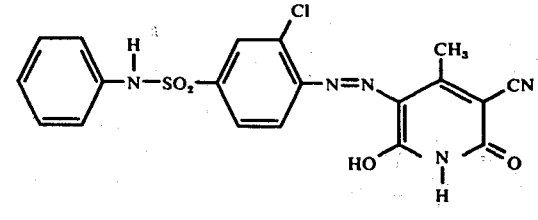 | greenish-yellow |

TABLE-continued

| I Ex. No. | II Dyestuff | III Shade on polyester |
|---|---|---|
| 31 | (structure) | greenish-yellow |
| 32 | (structure) | greenish-yellow |
| 33 | (structure) | greenish-yellow |
| 34 | (structure) | greenish-yellow |
| 35 | (structure) | greenish-yellow |
| 36 | (structure) | yellow |
| 37 | (structure) | yellow |
| 38 | (structure) | greenish-yellow |

TABLE-continued

| I<br>Ex.<br>No. | II<br>Dyestuff | III<br>Shade on polyester |
|---|---|---|
| 39 | (structure) | greenish-yellow |
| 40 | (structure) | yellow |
| 41 | (structure) | yellow |
| 42 | (structure) | greenish-yellow |

EXAMPLE 43

10 g of textured polyethylene glycol terephthalate knitted fabric is placed at room temperature into a dye bath situated in a closed dyeing apparatus, with a ratio of goods to liquor of 1:10, the dye bath having been prepared by dispersion of 0.8 g of the stock dispersion described in Example 18, and 0.5 g of a stock dispersion containing 0.025 g of the dyestuff of the formula

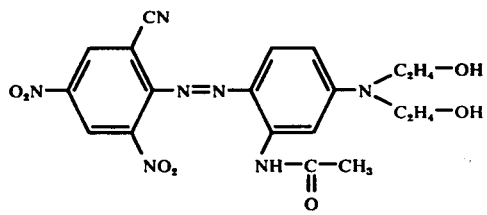

0.01 g of Antaron V 216 and 0.465 g of paraffin oil, in 98.5 ml of tetrachloroethylene. The dyeing apparatus is then closed, and the dye bath heated, with continuous movement of the material being dyed, in the course of 10 minutes to 121°, and maintained for 60 minutes at the boiling point of the tetrachloroethylene. After cooling to 80°, the material is rinsed and subsequently dried, as described in Example 18.

In this manner there is obtained on textured polyethylene glycol terephthalate knitted fabric a level, deeply coloured green dyeing which has good fastness to wet processing and to rubbing.

If, instead of the stock dispersion according to Example 18 used in Example 43, an equivalent amount of a corresponding 5% stock dispersion obtained with the dyestuff of the formula given in Example 19 is employed, the procedure otherwise being the same as that described in Example 43, then a dyeing having similarly good overall properties is obtained on textured polyester material.

EXAMPLE 44

If, instead of the knitted fabric made from polyethylene glycol terephthalate described in Example 18, 10 g of a fabric made from cellulose-2 ½-acetate, 10 g of a fabric made from cellulose triacetate or 10 g of a polyamide-6,6-tricot is used, the procedure being otherwise as described in Example 18, then there is obtained on the mentioned textile materials a deeply coloured, level, greenish-yellow dyeing which is well dyed throughout and which has good fastness to wet processing and to light.

We claim:

1. A process for dyeing synthetic textile material by the exhaust process, comprising the step of treating the textile material with a dispersion in a halogenated hydrocarbon solvent material of an azopyridone dyestuff of the formula

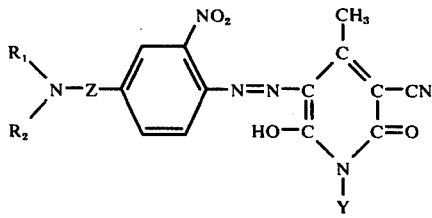

wherein
- $R_1$ and $R_2$ each independently represent hydrogen, or an optionally substituted lower alkyl, lower alkenyl, cycloalkyl or aryl radical, or
- $R_1$ and $R_2$ form together with the nitrogen atom binding them, optionally with the inclusion of a further hetero atom, a non-aromatic 5- or 6-membered hetero ring,
- Y represents hydrogen, or a lower alkyl group optionally substituted by the hydroxyl or cyano group, and
- Z represents —CO— or —$SO_2$—.

2. The process of claim 1 wherein of $R_1$ and $R_2$ one R represents hydrogen or a lower alkyl group, and the other R the phenyl or cyclohexyl group, and Z represents —CO—.

3. The process of claim 1, wherein Y represents hydrogen or the β-hydroxyethyl group.

4. The process of claim 1, wherein the halogenated hydrocarbon is a halogenated, lower aliphatic hydrocarbon.

5. The process of claim 4, wherein a chlorinated hydrocarbon boiling between 70° and 130° C is employed.

6. The process of claim 5, wherein the chlorinated hydrocarbon is tetrachloroethylene.

7. The process of claim 1, wherein the azopyridone dyestuff is finely dispersed, having a particle size below 5 µ.

8. The process of claim 1, wherein dyeing is performed at temperatures of between 120° and 150° C.

9. The process of claim 1, wherein the synthetic textile material is made from linear, high-molecular esters of aromatic polycarboxylic acids with polyfunctional alcohols.

10. The process of claim 9, wherein the synthetic textile material is polyethylene glycol terephthalate fibre.

11. The dyed synthetic textile material, dyed according to claim 1.

12. The dyed synthetic textile material of claim 11, wherein the textile material is polyester material.

13. The process of claim 1, wherein $R_1$ represents hydrogen or a lower alkyl group, $R_2$ represents the phenyl or cyclohexyl group. Y represents hydrogen or the β-hydroxyethyl group, and Z represents —$SO_2$—.

* * * * *